United States Patent
Manoogian

[15] 3,700,211
[45] Oct. 24, 1972

[54] FAUCET VALVE

[72] Inventor: Alex Manoogian, Grosse Pointe Farms, Mich.

[73] Assignee: Masco Corporation, Taylor, Mich.

[22] Filed: July 27, 1971

[21] Appl. No.: 166,543

[52] U.S. Cl..................................251/304, 251/315
[51] Int. Cl................................................F16k 5/22
[58] Field of Search......251/118, 120, 209, 304, 309, 251/310, 312, 315

[56] References Cited
UNITED STATES PATENTS
1,677,242   7/1928   Larrigan....................251/310

*Primary Examiner*—Henry T. Klinksiek
*Attorney*—L. Gaylord Hulbert, et al.,

[57] ABSTRACT

A faucet valve in which the valve member comprises a ball rotatable on a horizontal axis within a spherical socket formed in the valve body, the ball having a passage therein having its inlet movable into and out of registry with an inlet port in the valve body and its outlet in constant communication with an outlet port in the valve body.

3 Claims, 3 Drawing Figures

PATENTED OCT 24 1972
3,700,211
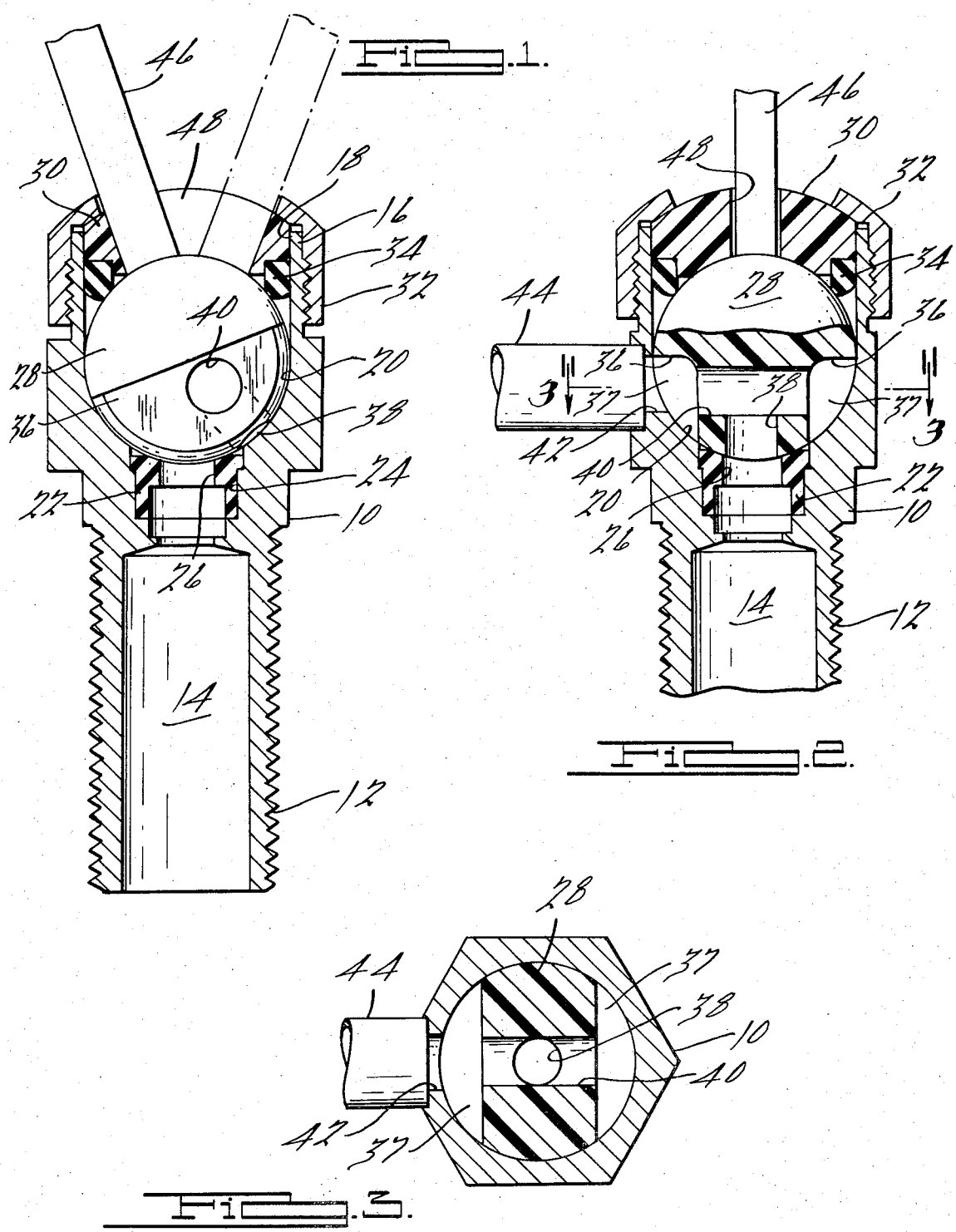
INVENTOR.
Alex Manoogian
BY Whittemore,
Hulbert & Belknap
ATTORNEYS.

FAUCET VALVE

The invention relates to faucet valves of the type in which a separate valve is used to control the hot and cold water supply lines. In general the valve of this invention comprises a valve body having a spherical socket therein having a vertically disposed inlet port opening into the spherical socket and a laterally directed outlet port communicating with the socket, and a valve member in the form of a ball rotatable within the spherical socket and having a passage therein including a radially extending inlet movable into and out of registry with the inlet port, cut-out portions on opposite sides of the inlet in the valve member to define cavities between the valve member and valve body, one of which cavities is in constant communication with the outlet port in the valve body, the outlet passage in the valve member extending perpendicular to the inlet passage and terminating in the cut-out portions of the valve member. A valve stem secured to the ball valve member extends upwardly through a control cap having a slot therein through which the stem is moved by means of a handle to rotate the ball on a horizontal axis between open and closed positions. The valve stem is rectangular in cross section to prevent rotation of the ball on the axis of the stem. In the drawings:

FIG. 1 is a vertical sectional view through a faucet valve constructed according to the present invention and showing the valve member in its closed position;

FIG. 2 is a vertical sectional view taken at right angles to the plane of FIG. 1 and showing the valve member in its open position; and FIG. 3 is a horizontal sectional view taken on line 3—3 of FIG. 2.

The valve includes a valve body 10 having an externally threaded lower end 12 which is adapted to be connected to a hot or cold water supply line and has an inlet passage 14 therein. The valve body has a cylindrical upper end 16 having an upwardly opening cylindrical bore 18, the lower end of which is formed by a concave spherical socket portion 20. A valve seat member 22 is disposed within a bore 24 which opens into the socket 20 and communicates with the inlet passage 14 in the valve body. The valve seat member 22 has an opening 26 therein which forms the inlet port to the socket 20.

A valve member in the form of a ball 28 is seated in the socket 20 and is confined therein by a control cap 30 which is disposed within the upper end of the bore 18 in the valve body. An end cap 32 is threaded onto the upper end 16 of the valve body and engages the upper surface of the control member 30 to urge the annular seal 34 carried by the control member 30 into sealing engagement with the ball 28 and to urge the ball 28 into sealing engagement with the valve seat member 22.

The lower half of the ball 28 is provided with oppositely disposed cut-out portions 36 which define cavities 37 between the ball 28 and the socket 20 in valve body 10. The ball has a passage therein which includes an inlet portion 38 which is radially extending and opens from the spherical surface of the ball 28. The passage includes an outlet portion 40 which is perpendicular to the inlet portion 38 and opens at its opposite ends into the cavities 37. The outlet port 42 in the valve body 10 opens laterally from the socket 20, and a pipe 44 connected to the outlet port 42 leads to a spout. The outlet port 42 is always in communication with one of the cavities 37.

A valve stem 46 is secured to the ball 28 and extends upwardly through an elongated slot 48 in the control member 30 and is adapted to have a handle secured thereto for rotating the ball 28 on a horizontal axis which extends through the center of the ball and is perpendicular to the slot 48. The stem 46 is rectangular in cross section with the width of the slot 48 being only slightly greater than the smallest cross sectional dimension of the stem 46 so that the inlet passage 38 in the ball will be properly oriented relative to the inlet port 26 in the valve body when the valve is assembled.

The valve is shown in FIG. 1 in its closed position in which the inlet passage 38 in the ball 28 is out of registry with the inlet port 26 with the valve stem 46 being disposed at one end of the slot 48. When the ball is rotated by moving the stem 46 toward the other end of the slot 48, the inlet 38 in the ball 28 is brought into registry with the inlet port 26 and water will be discharged into the cavities 37 and through the outlet port 42. The cavities 37 are relatively large as compared with the size of the orifice through which water flows when the passages 38 and 26 are in only partial registration and serve to reduce undesirable turbulence.

What I claim as my invention is:

1. A faucet valve comprixing a valve body having an upwardly open bore therein and a spherical socket at the lower end of said bore, a vertically extending inlet port opening into the bottom of said socket and an outlet port opening from said socket, a ball valve member in said socket and having an inlet passage, said ball having cut-out portions to define cavities between said ball and said socket, said ball having an outlet passage opening at its opposite ends into said cavities, one of said cavities being disposed opposite and in constant communication with said outlet port in said valve body, a control member in the upper end of said bore having an elongated slot therein, an operating stem secured to said ball and projecting upwardly through said slot for rotating said ball on a horizontal axis to bring said inlet passage in said ball into and out of registry with said inlet port in said valve body, and means to prevent rotation of said ball except on said horizontal axis.

2. A valve according to claim 1 including an annular seal carried by said control member and engaging said ball around said valve stem, an end cap threaded onto the upper end of said valve body and engaging said control member to urge said seal into sealing engagement with said ball.

3. A valve according to claim 1 wherein said inlet passage in said ball opens from the spherical surface of said ball between said cut-out portions, said outlet passage being disposed perpendicular to said inlet passage.

* * * * *